(12) United States Patent
Sugimoto

(10) Patent No.: US 8,477,355 B2
(45) Date of Patent: Jul. 2, 2013

(54) IMAGE FORMING SYSTEM AND IMAGE FORMING APPARATUS SETTINGS SEARCH METHOD USING WS-DISCOVERY

(75) Inventor: Kensaku Sugimoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 212 days.

(21) Appl. No.: 13/073,002

(22) Filed: Mar. 28, 2011

(65) Prior Publication Data
US 2011/0235117 A1    Sep. 29, 2011

(30) Foreign Application Priority Data

Mar. 29, 2010  (JP) ................................ 2010-074605
Mar. 29, 2010  (JP) ................................ 2010-074610

(51) Int. Cl.
*G06F 15/00* (2006.01)
(52) U.S. Cl.
USPC .......... 358/1.15; 358/1.13; 709/223; 709/203
(58) Field of Classification Search
None
See application file for complete search history.

(56) References Cited

U.S. PATENT DOCUMENTS

| | | | | |
|---|---|---|---|---|
| 7,756,955 B2* | 7/2010 | Takagi | ........................... | 709/221 |
| 8,275,872 B2* | 9/2012 | Moriya | ........................ | 709/223 |
| 2007/0124513 A1* | 5/2007 | Kikuchi | ............................ | 710/8 |
| 2008/0052342 A1 | 2/2008 | Koga | | |
| 2008/0130639 A1 | 6/2008 | Costa-Requena et al. | | |
| 2008/0180726 A1* | 7/2008 | Selvaraj | ........................ | 358/1.15 |
| 2008/0189693 A1 | 8/2008 | Pathak | | |
| 2008/0287058 A1 | 11/2008 | Nahm | | |
| 2010/0005058 A1* | 1/2010 | Tago et al. | ......................... | 707/2 |
| 2010/0125641 A1* | 5/2010 | Shelby | ........................... | 709/206 |
| 2011/0235117 A1* | 9/2011 | Sugimoto | .................... | 358/1.15 |

FOREIGN PATENT DOCUMENTS

| | | |
|---|---|---|
| EP | 2133790 | 12/2009 |
| JP | 06-324823 | 11/1994 |
| JP | 2004-160950 | 6/2004 |
| JP | 2007-148828 | 6/2007 |
| JP | 2007-329572 | 12/2007 |

OTHER PUBLICATIONS

Windows Server 2003, Web Services Dynamic Discovery (WS-Discovery), 2011, available at http://msdn.microsoft.com/en-us/library/bb706924.aspx (last visited Feb. 17, 2011).

* cited by examiner

*Primary Examiner* — Twyler Haskins
*Assistant Examiner* — Helen Q Zong
(74) *Attorney, Agent, or Firm* — McDonnell Boehnen Hulbert & Berghoff LLP

(57) ABSTRACT

An image forming apparatus stores a settings keyword, receives a Probe message including a search keyword from a client apparatus via a network, retrieves the search keyword from the Probe message, determines whether or not the search keyword from the Probe message matches the stored settings keyword, and transmits a ProbeMatch message to the client apparatus if the search keyword from the Probe message matches the stored settings keyword. Further, the image forming apparatus stores setting data, searches for another image forming apparatus having a function of transmitting the setting data based on a keyword search using WS-Discovery, requests the setting data from the specified another image forming apparatus, generates new setting data based on the setting data received from the another image forming apparatus, and stores the new setting data.

15 Claims, 11 Drawing Sheets

```
<s:Envelope
  xmlns:d="http://schemas.xmlsoap.org/ws/2004/05/discovery"
  xmlns:s="http://www.w3.org/2003/05/soap-envelope" >
  <s:Body>
    <d:Probe>
      <keyword> KM5010 </keyword>
    </d:Probe>
  </s:Body>
</s:Envelope>
```

FIG. 5

```
<s:Envelope
  xmlns:a="http://schemas.xmlsoap.org/ws/2004/08/addressing"
  xmlns:d="http://schemas.xmlsoap.org/ws/2004/05/discovery"
  xmlns:s="http://www.w3.org/2003/05/soap-envelope" >
  <s:Body>
    <d:ProbeMatch>
      <a:endpointReference>
        <a:Address> uuid:... </a:Address>
      </a:endpointReference>
      <keyword> KM5010 </keyword>
    </d:ProbeMatch>
  </s:Body>
</s:Envelope>
```

FIG. 6

```
<s:Envelope
 xmlns:d="http://schemas.xmlsoap.org/ws/2004/05/discovery"
 xmlns:s="http://www.w3.org/2003/05/soap-envelope" >
 <s:Body>
  <d:Probe>
   <keyword> SettingDataCopying </keyword>
  </d:Probe>
 </s:Body>
</s:Envelope>
```

FIG. 10

```
<s:Envelope
  xmlns:a="http://schemas.xmlsoap.org/ws/2004/08/addressing"
  xmlns:d="http://schemas.xmlsoap.org/ws/2004/05/discovery"
  xmlns:s="http://www.w3.org/2003/05/soap-envelope" >
  <s:Body>
    <d:ProbeMatch>
      <a:endpointReference>
        <a:Address> uuid:... </a:Address>
      </a:endpointReference>
      <keyword> SettingDataCopying </keyword>
    </d:ProbeMatch>
  </s:Body>
</s:Envelope>
```

FIG. 11

IMAGE FORMING SYSTEM AND IMAGE FORMING APPARATUS SETTINGS SEARCH METHOD USING WS-DISCOVERY

INCORPORATION BY REFERENCE

This application is based upon and claims the benefit of priority from corresponding Japanese Patent Application Nos. 2010-074605 and 2010-074610, both filed Mar. 29, 2010, the entire contents of each of which is incorporated herein by reference.

BACKGROUND

1. Field of the Invention

The present invention relates to an image forming system and an image forming apparatus search method using WS-Discovery.

2. Description of the Related Art

An image forming apparatus such as a printer, a copier, a facsimile machine, or a multifunction peripheral (MFP) stores a setting value of a setting item for each function, such as printing, and executes a job on the basis of the setting value. When the image forming apparatus is introduced, the setting value is an initial value, which is not always set appropriately for each user. Therefore, there is an image forming apparatus that receives the setting value from another image forming apparatus via a network and stores the setting value for the image forming apparatus. In detail, there is an image forming apparatus that stores a list indicating models of the image forming apparatuses connected to the network, and specifies an image forming apparatus of a model similar to the image forming apparatus in the list, and receives the setting value from the specified similar image forming apparatus.

However, in a case where the list is to be stored in the respective image forming apparatuses, the lists stored in all the image forming apparatuses need to be updated when an image forming apparatus is added to or removed from the network. This increases the amount of work required to manage the system.

Therefore, there is an idea of searching the network for image forming apparatuses already connected to the network at the time of newly connecting an image forming apparatus to the network.

Meanwhile, there is a method using WS-Discovery in which a client apparatus searches the network for a device providing a desired web service. In using WS-Discovery, the client apparatus multicasts a Probe message to the devices connected to the network. When receiving the Probe message, the device providing the web service specified by the Probe message transmits a ProbeMatch message to the client apparatus.

That is, when one or more image forming apparatuses are connected via the network, it is possible for the client apparatus to search for the image forming apparatus providing a desired web service by using WS-Discovery.

However, in the conventional technology using WS-Discovery, the device is searched by using a desired type of web service as a key. Therefore, it is difficult to search for, for example, an image forming apparatus of a specific model or an image forming apparatus belonging simultaneously to two or more groups.

Further, in a case of searching, via the network, to determine what kinds of functions an image forming apparatus has, there is a method of receiving setting values of the functions one by one from the image forming apparatuses by using Simple Network Management Protocol (SNMP).

However, in the case of receiving the setting values of the functions from the respective image forming apparatuses via the network using SNMP, a receiving time period becomes longer in proportion to the number of the image forming apparatuses.

SUMMARY

The present disclosure relates to an image forming system and an image forming apparatus search method that searches for an image forming apparatus, via a network, which can be a copy source of a setting value, the search being performed in a short time period by using WS-Discovery.

An image forming system according to an aspect of the present disclosure includes an image forming apparatus connected to a network and a client apparatus connected to the network. The client apparatus includes a first communication processing unit that transmits a multicast Probe message, including a keyword as a search key, to the image forming apparatus. The image forming apparatus includes a storage device that stores a keyword, a second communication processing unit that receives the Probe message from the first communication processing unit, a message analysis unit that retrieves the keyword from the received Probe message, and a keyword determination unit that determines whether or not the keyword from the received Probe message matches the keyword stored in the storage device. If the keyword determination unit determines that the keyword from the received Probe message matches the keyword stored in the storage device, the second communication processing unit responsively transmits a ProbeMatch message to the first communication processing unit.

An image forming apparatus search method using WS-Discovery according to an aspect of the present disclosure includes: via a client apparatus connected to a network, transmitting a multicast Probe message including a keyword as a search key to an image forming apparatus connected to the network; receiving the Probe message from the client apparatus; retrieving the keyword from the received Probe message; determining whether or not the keyword from the received Probe message matches a keyword stored in the image forming apparatus; and responsively transmitting a ProbeMatch message to the client apparatus if the keyword in the received Probe message matches the keyword stored in the image forming apparatus.

An image forming system according to another aspect of the present disclosure includes an image forming apparatus connected to a network and another image forming apparatus connected to the network. The image forming apparatus includes a first communication processing unit that transmits a multicast Probe message including a keyword as a search key to the another image forming apparatus. The another image forming apparatus includes a storage device that stores the keyword, a second communication processing unit that receives the Probe message from the first communication processing unit, a message analysis unit that retrieves the keyword from the received Probe message, and a keyword determination unit that determines whether or not the retrieved keyword from the received Probe message matches the keyword stored in the storage device. If the retrieved keyword in the received Probe message matches the keyword stored in the storage device, the second communication processing unit responsively transmits a ProbeMatch message to the first communication processing unit.

Additional features and advantages are described herein, and will be apparent from the following Detailed Description and the drawings.

BRIEF DESCRIPTION OF FIGURES

In the accompanying drawings:

FIG. 5 is a diagram illustrating an example of a Probe message according to the first embodiment;

FIG. 6 is a diagram illustrating an example of a Probe-Match message according to the first embodiment;

FIG. 10 is a diagram illustrating an example of a Probe message according to the second embodiment; and FIG. 11 is a diagram illustrating an example of a Probe-Match message according to the second embodiment.

DETAILED DESCRIPTION

Figure 1:
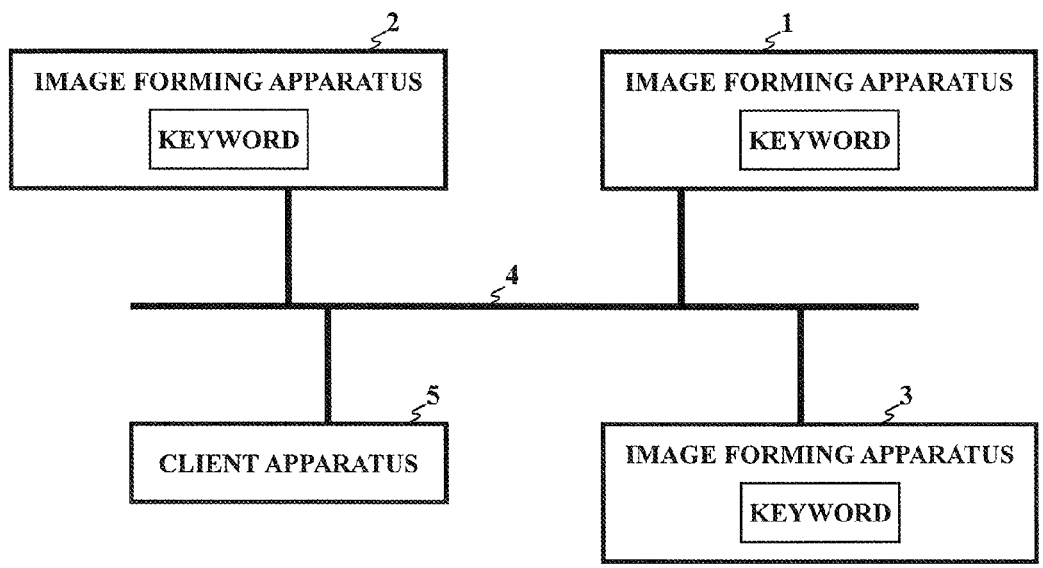
FIG. 1 is a block diagram illustrating a configuration of an image forming system according to a first or second embodiment.

FIG. 1 is a block diagram illustrating a configuration of an image forming system according to one and/or both of a first embodiment and a second embodiment. Image forming apparatuses 1, 2, and 3 are connected to a network 4, and a client apparatus 5 is also connected to the network 4.

The image forming apparatuses 1, 2, and 3 may include a printer, a copier, a facsimile machine, a multifunction peripheral (MFP), or the like, and may have network functions. Keywords indicating attributes of the image forming apparatuses 1, 2, and 3, such as models, functions, and groups to which the image forming apparatuses 1, 2, and 3 belong, are registered in the respective image forming apparatuses 1, 2, and 3.

The network 4 may be a computer network including a local area network (LAN) and/or a wide area network (WAN).

First Embodiment

Figure 2:
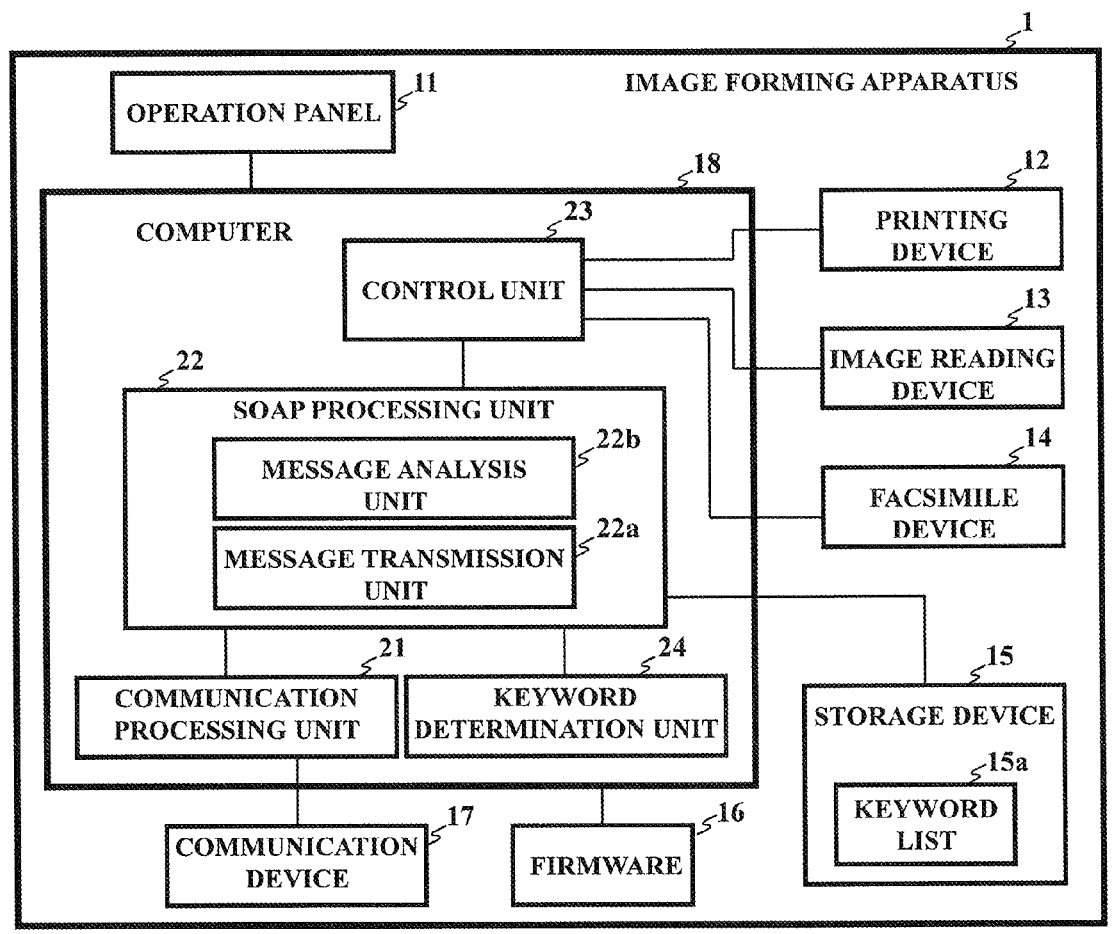
FIG. 2 is a block diagram illustrating a configuration of an image forming apparatus according to the first embodiment.

FIG. 2 is a block diagram illustrating a configuration of the image forming apparatus 1 according to a first embodiment. The image forming apparatus 1 illustrated in FIG. 2 may be a MFP. It should be noted that, the image forming apparatuses 2 and/or 3 illustrated in FIG. 1 may have the same or similar configuration to that of image forming apparatus 1 in FIG. 2. Further, while the three image forming apparatuses 1, 2, and 3 are illustrated as connected to the network 4 in FIG. 1, instead, two or less or four or more image forming apparatuses may be connected to the network 4.

As set forth in FIG. 2, the image forming apparatus 1 includes an operation panel 11, a printing device 12, an image reading device 13, a facsimile device 14, a storage device 15, firmware 16, a communication device 17, and a computer 18.

The operation panel 11 may include a user interface device including a display device such as a liquid crystal display (LCD) and an input device that electrically detects a physical user operation. A key switch and a transparent touch panel located on a screen of the display device may be used as the input device.

The printing device 12 may be an internal device that prints a document image based on document data generated by the image reading device 13, document data stored in a document box (not illustrated), document data received from a host device (not illustrated) via the network 4, or other such document data. It should be noted that the document data represents image data of a predetermined format.

The image reading device 13 is an internal device that applies light to one side surface or both side surfaces of an original document, perhaps supplied from an automatic document feeder or an original placed by a user, receives reflected light to read an image of the original document, and outputs the corresponding image reflecting the original document as the document data.

The facsimile device 14 may include a modem, and is an internal device that generates a facsimile signal from document data generated by the image reading device 13 or document data stored in the document box and transmits the generated facsimile signal via a telephone line or the like, and that receives a facsimile signal and generates the document data from the received facsimile signal.

The storage device 15 is a device that stores a keyword list 15a, the document data, and the like. The storage device 15 may include a device that drives a nonvolatile readable/writable recording medium, such as a hard disk drive or a nonvolatile memory.

The keyword list 15a is a list including one or more keywords that indicate attributes of the image forming apparatus 1. The keywords within the keyword list 15a may be previously registered in the image forming apparatus 1 or added from an external device or the like. In a case of adding a keyword from the external device, the keyword may be added to the image forming apparatus 1 using, for example, SNMP or a web service.

The firmware 16 includes a program that may be loaded onto and executed by the computer 18, and includes a description of a process for transmitting/receiving a Simple Object Access Protocol (SOAP) message. The firmware 16 may be stored in a nonvolatile memory such as a flash memory.

The communication device 17 is connected to the network 4, and is a device that can communicate to other devices (the image forming apparatuses 2, 3, and/or the client apparatus 5) connected to the network 4. The communication device 17 includes a network interface.

The computer 18, which includes a central processing unit (CPU) (not illustrated), a random access memory (RAM) (not illustrated), and a read only memory (ROM) (not illustrated), is a device that implements processing units by loading a program into the RAM and executing the program by the CPU. On the basis of the firmware 16 and the program (not illustrated), the computer 18 implements a communication processing unit 21, a SOAP processing unit 22, a control unit 23, and a keyword determination unit 24.

The communication processing unit 21 (an example of a second communication processing unit) is a processing unit that controls the communication device 17 to transmit/receive a message via the network 4 using a communication protocol. A Probe message and a ProbeMatch message of WS-Discovery are SOAP messages that may be transmitted/received via the communication device 17, and the communication processing unit 21 may use User Datagram Protocol/Internet Protocol (UDP/IP) as the communication protocol for transmitting/receiving the SOAP message.

The SOAP processing unit 22 includes a message transmission unit 22a and a message analysis unit 22b. The message transmission unit 22a generates a SOAP message, and transmits the SOAP message via the communication processing unit 21 and the communication device 17. The SOAP message is text data described in Extensible Markup Language (XML). The message analysis unit 22b performs a syntactic analysis of the SOAP message received via the communication processing unit 21 and the communication device 17, and specifies a request, a response, a notification, and the like that are described in the SOAP message.

The communication processing unit 21 receives the Probe message from the client apparatus 5, and the message analysis unit 22b retrieves the keyword as a search key from the received Probe message. In the first embodiment, the Probe message represents a keyword search request for the image forming apparatus 1. If the keyword as the search key matches the keyword stored in the storage device 15, the message transmission unit 22a generates the ProbeMatch message, and transmits the ProbeMatch message to the client apparatus 5 via the communication processing unit 21 and the communication device 17.

The control unit 23 is a processing unit that controls internal devices realizing various functions, such as a printing device 12, an image reading device 13, or a facsimile device 14, so as to execute a job on the basis of a user operation initiated via the operation panel 11.

The keyword determination unit 24 is a processing unit that determines whether or not the keyword as the search key in the Probe message matches the keyword stored in the storage device 15.

It should be noted that, when a keyword search condition is described in the Probe message, the keyword determination unit 24 searches for the keyword stored in the storage device 15 on the basis of the keyword search condition.

For example, as the keyword search condition, the Probe message may include a search expression including one or more keywords. The keyword determination unit 24 determines whether or not the one or more keywords match the keyword stored in the storage device 15 on the basis of the search expression. The search expression may represent a logical operation expression including one or more keywords. For example, the search expression "KM5010 AND Designing Department" is a logical product of two keywords "KM5010" and "Designing Department", and the keyword determination unit 24 determines whether or not the keyword "KM5010" matches the keyword stored in the storage device 15 and whether the keyword "Designing Department" also matches the keyword stored in the storage device 15.

Further, the keyword search condition may include a match condition for the keyword. The match condition for the keyword may include at least one of "perfect match search", "partial match search", "prefix search", and "suffix search". A successful perfect match search means that both the search key and the keyword stored in the storage device 15 are the same. A successful partial match search means that the search key is the same as a part or all of the keyword stored in the storage device 15. A successful prefix search means that the search key is the same as a leading part or all of the keyword in the storage device 15. A successful suffix search means that the search key is the same as a trailing part or all of the keyword in the storage device 15.

Figure 3:
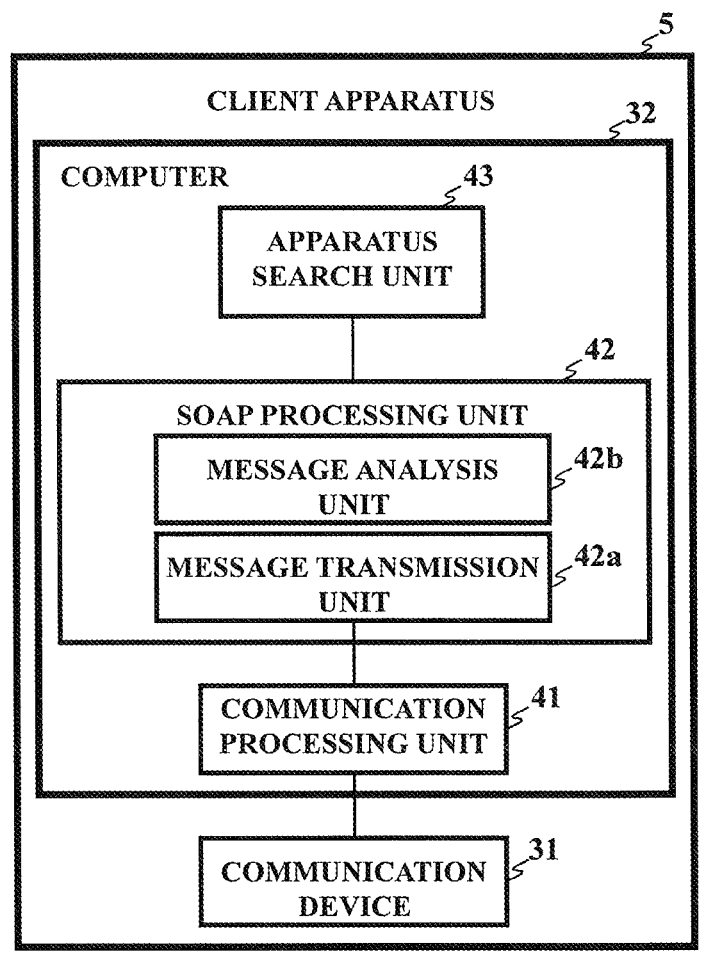
FIG. 3 is a block diagram illustrating a configuration of a client apparatus according to the first embodiment.

FIG. 3 is a block diagram illustrating a configuration of the client apparatus 5.

A communication device 31 is connected to the network 4, and is a device that communicates with other devices (the image forming apparatuses 1, 2, and/or 3) connected to the network 4. The communication device 31 may include a network interface.

A computer 32 including a CPU (not illustrated), a RAM (not illustrated), and a ROM (not illustrated) is a device that implements processing units by loading a program into the RAM and executing the program by the CPU. On the basis of the program (not illustrated), the computer 32 implements a communication processing unit 41, a SOAP processing unit 42, and an apparatus search unit 43.

The communication processing unit 41 (an example of a first communication processing unit) is a processing unit that controls the communication device 31 to transmit/receive a message via the network 4 using a communication protocol. The communication processing unit 41 may use UDP/IP as the communication protocol for transmitting/receiving the Probe message and the ProbeMatch message.

The SOAP processing unit 42 includes a message transmission unit 42a and a message analysis unit 42b which are similar to the message transmission unit 22a and the message analysis unit 22b of the image forming apparatus 1 described above with respect to FIG. 2.

The message transmission unit 42a generates the Probe message including the keyword as the search key when an image forming apparatus is searched by the apparatus search unit 43. The keyword as the search key is provided by the apparatus search unit 43. As set forth earlier, the message transmission unit 42a may describe a keyword search condition in the Probe message.

The apparatus search unit 43 is a processing unit that uses the SOAP processing unit 42 to search for the image forming apparatuses 1, 2, and/or 3 by a user operation via an input device (not illustrated) or to search for the image forming apparatuses 1, 2, and/or 3 in a series of processes executed within the client apparatus 5.

It should be noted that, the client apparatus 5 may be a host device such as a personal computer or may be an image forming apparatus.

Figure 4:
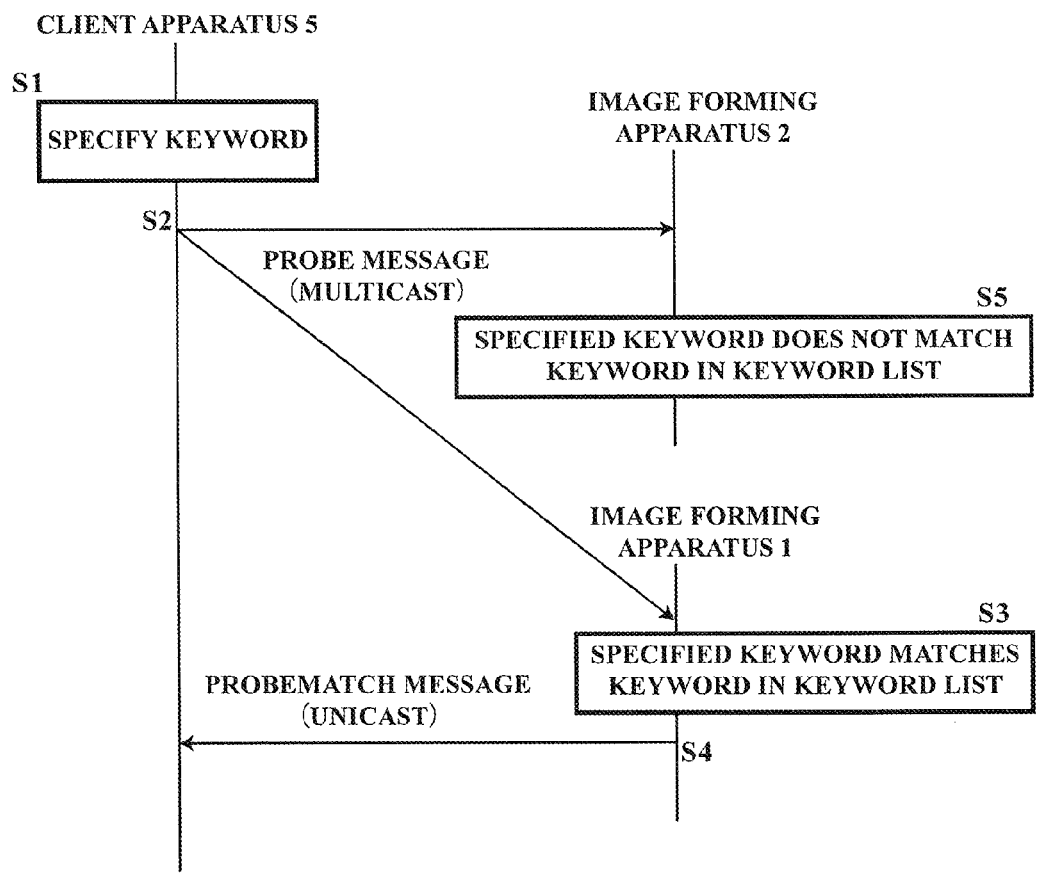
FIG. 4 is a sequence diagram illustrating an image forming apparatus search method according to the first embodiment.

FIG. 4 is a sequence diagram illustrating an image forming apparatus search method according to the first embodiment. In FIG. 4, the image forming apparatus 3 in FIG. 1 is omitted for ease of illustration.

When the client apparatus 5 receives a request to search for an image forming apparatus by a user operation or via a series of processes, the apparatus search unit 43 retrieves a keyword as the search key (and/or a keyword search condition) from the request, and notifies the SOAP processing unit 42 of the keyword (Step S1).

The message transmission unit 42a of the SOAP processing unit 42 generates the Probe message including the keyword as the search key. The communication processing unit 41 uses the communication device 31 to transmit the Probe message via multicast (Step S2). FIG. 5 is a diagram illustrating an example of the Probe message used in the image forming system according to the first embodiment. The Probe message includes a Probe element. In the Probe message, a keyword element is described as a child element of the Probe element, and the keyword (in the first embodiment, "KM5010") is described as a value of the keyword element.

The Probe message is then transmitted via the network 4 and received by the image forming apparatuses 1, 2, and/or 3.

On the image forming apparatuses 1, 2, and/or 3, the communication processing unit 21 receives the Probe message via the communication device 17, and the message analysis unit 22b analyzes the Probe message and retrieves the keyword from the Probe message.

Then, the keyword determination unit 24 of the image forming apparatuses 1, 2, and/or 3 searches for the keyword in the keyword list 15a, and determines whether or not the retrieved keyword matches the keyword in the keyword list 15a.

In FIG. 4, if the retrieved keyword from the Probe message is determined to match the key word in the keyword list 15a by the keyword determination unit 24 of the image forming apparatus 1 (Step S3), the message transmission unit 22a of the image forming apparatus 1 generates a ProbeMatch message, and then the image forming apparatus 1 transmits the ProbeMatch message via unicast to the client apparatus 5 that had transmitted the Probe message (Step S4).

FIG. 6 is a diagram illustrating an example of a Probe-Match message according to the first embodiment. The ProbeMatch message corresponds to the Probe message illustrated in FIG. 5.

The ProbeMatch message includes a ProbeMatch element. In the ProbeMatch message, an endpointReference element and the keyword element are described as child elements of the ProbeMatch element. The keyword ("KM5010") as the search key is described as the value of the keyword element. An identifier such as a uniform resource identifier (URI) or a universally unique identifier (UUID) of the image forming apparatus 1 on the network 4 is described as the value of the endpointReference element.

On the other hand, in FIG. 4, if the retrieved keyword from the Probe message is determined to not match the keyword in the keyword list 15a by the keyword determination unit 24 of the image forming apparatus 2 (Step S5), a process is finished without generating and transmitting the ProbeMatch message.

According to the above-described first embodiment, it is possible to search for the image forming apparatus 1 on the network 4 with detailed search condition(s) based on a keyword search using WS-Discovery. Further, even when a large number of image forming apparatuses are connected to the network 4, it is possible to search for the image forming apparatus 1 in a short time period.

The present disclosure of the first embodiment includes various other embodiments. For example, other designs can be used in which the above-described components are each performed.

In the first embodiment, by registering a group ID of one or more groups to which the image forming apparatus 1 belongs as a keyword in the image forming apparatuses 2 and/or 3, even if a network identifier such as an IP address is changed in the image forming apparatus 1 due to a change in network setting, it is possible to search for the image forming apparatuses 2 and/or 3 belonging to the group.

In the first embodiment, the Probe message and the Probe-Match message may include an identifier for distinguishing from conventional searches for web services using WS-Discovery. The identifier may be described as an XML element (parent element or child element of the Probe element and ProbeMatch element), or the identifier may be a character string added to element names. In that case, if the received Probe message includes the identifier for distinguishing from conventional searches for web services, the keyword determination unit 24 determines whether or not the keyword as the search key matches the keyword stored in the storage device 15.

In the above-described case, if the received Probe message includes the identifier for distinguishing from a conventional search for web services, when the keyword as the search key matches the keyword stored in the storage device 15, the communication processing unit 21 transmits the ProbeMatch message to the client apparatus 5. In addition, if the received Probe message includes the identifier for distinguishing from a conventional search for web services, when the web service specified in the Probe message is provided by the image forming apparatus 1, the communication processing unit 21 transmits the ProbeMatch message to the client apparatus 5.

In the first embodiment, at startup of the image forming apparatus 1, the message transmission unit 22a may generate a Hello message of WS-Discovery, and the communication processing unit 21 may transmit the Hello message via multicast. If the Hello message is received after searching by a given keyword, the client apparatus 5 may again search using the keyword and transmit the Probe message including the keyword to the image forming apparatus which transmitted the Hello message.

In the first embodiment, at shutdown of the image forming apparatus 1, the message transmission unit 22a may generate a Bye message of WS-Discovery, and the communication processing unit 21 may transmit the Bye message via multicast. If the Bye message is received after receiving the Probe-Match message from the image forming apparatus 1, the client apparatus 5 may delete the image forming apparatus 1 from a search result (specifying the image forming apparatus 1).

Second Embodiment

Figure 7:
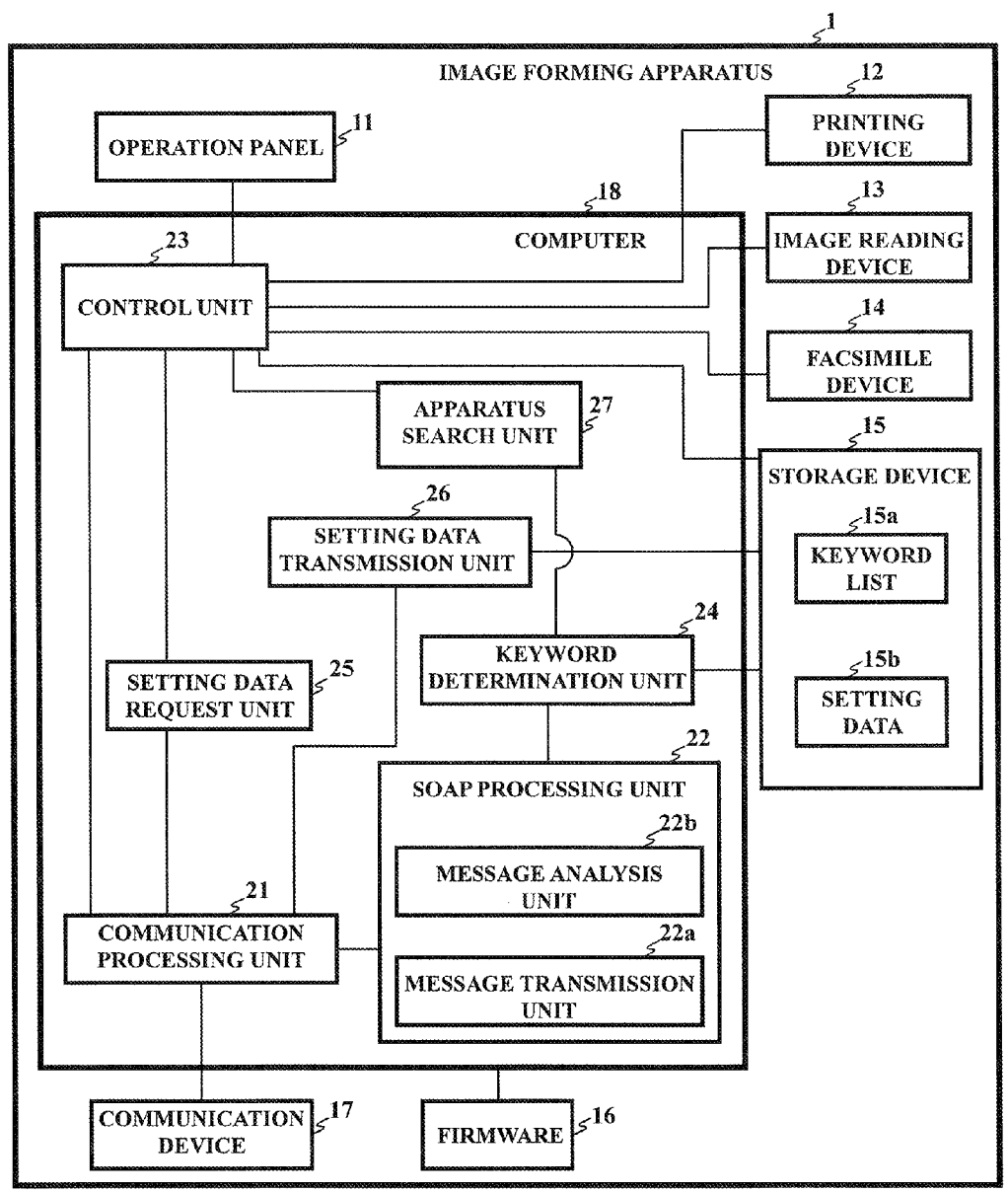
FIG. 7 is a block diagram illustrating a configuration of an image forming apparatus according to the second embodiment.

FIG. 7 is a block diagram illustrating a configuration of an image forming apparatus 1 according to a second embodiment. The image forming apparatus 1 illustrated in FIG. 7 may be a multifunction peripheral (MFP). It should be noted that, the image forming apparatus 2 and/or 3 illustrated in FIG. 1 may also have the same or similar configuration as the image forming apparatus illustrated in FIG. 7. Further, while the three image forming apparatuses 1, 2, and 3 are illustrated as connected to the network 4 in FIG. 1, instead, two or less or four or more image forming apparatuses may be connected to the network 4.

The image forming apparatus 1 includes an operation panel 11 (an example of a display device), a printing device 12, an image reading device 13, a facsimile device 14, a storage device 15, firmware 16, a communication device 17, and a computer 18. Hereinafter, description of the same or similar devices, units, and the like in the image forming apparatus 1 according to the second embodiment as/to those in the image forming apparatus 1 according to the first embodiment may be omitted.

The storage device 15 is a device that stores a keyword list 15a, setting data 15b, and the like.

The setting data 15b may include setting values of setting items for each of one or more categories. The categories may include a print setting, a network setting, a copy setting, a finisher setting, and the like.

The setting data 15b may include default values prestored when the image forming apparatus 1 is shipped from the factory, and which may be updated by an initial setting process so as to suit a use environment of the user. After that, the user can cause a setting screen to be displayed on the operation panel 11 and change the setting values in the setting data 15b on the setting screen.

In the same manner as the image forming apparatus 1 according to the first embodiment, the keyword list 15a is the list including one or more keywords that indicate attributes of the image forming apparatus 1. The keywords in the keyword list 15a may be previously registered in the image forming apparatus 1 or added in response to a request from the external device or the like. In the case of adding a keyword from the external device, the keyword may be added to the image forming apparatus 1 using SNMP and/or via a web service.

The keyword list 15a of the image forming apparatus 1 that has a function of transmitting setting data includes a predetermined keyword (in the second embodiment, "SettingData-Copying") indicating that the image forming apparatus 1 has the function of transmitting the setting data, while the keyword list 15a of the image forming apparatus 1 that does not have the function of transmitting the setting data does not include the predetermined keyword.

It should be noted that, the keyword used as the search key may be different at each kind (for example, model/series) of the image forming apparatus. That is, two or more different image forming apparatuses of the same model/series (for example, the image forming apparatus 1 and the image forming apparatus 2 of FIG. 1) may include the same keyword. Among two or more different image forming apparatuses of the same model/series, the setting item of the setting data 15b on one image forming apparatus may become a subset or a superset of the setting data 15b on other image forming apparatuses. Therefore, by registering the same keyword both in the image forming apparatuses 1 and 2, it is possible to search for the image forming apparatus 2 including the setting data 15b appropriate for the image forming apparatus 1.

The computer 18, which includes a CPU (not illustrated), a RAM (not illustrated), and a ROM (not illustrated), is a device that implements processing units by loading a program into the RAM and executing the program by the CPU. On the basis of the firmware 16 and the program (not illustrated), the computer 18 implements a communication processing unit 21, a SOAP processing unit 22, a apparatus search unit 23, a keyword determination unit 24, a setting data request unit 25, a setting data transmission unit 26, and a control unit 23.

The communication processing unit 21 is a processing unit that controls the communication device 17 to execute electronic mail transmission such as ScanToEmail according to a communication protocol such as Simple Mail Transfer Protocol (SMTP). Further, the communication processing unit 21 is a processing unit that controls the communication device 17 to transmit/receive a SOAP message via the network 4 using a communication protocol. A Probe message and a ProbeMatch message of WS-Discovery are examples of SOAP messages, and the communication processing unit 21 may use a User Datagram Protocol/Internet Protocol (UDP/IP) as the communication protocol for transmitting/receiving the SOAP message.

The SOAP processing unit 22 includes a message transmission unit 22a and a message analysis unit 22b.

The message transmission unit 22a generates a SOAP message, and transmits the SOAP message via the communication processing unit 21 and the communication device 17. The SOAP message is text data described in Extensible Markup Language (XML). The message transmission unit 22a generates the Probe message including the keyword as the search key when the apparatus search unit 27 searches for other image forming apparatuses. Further, the message transmission unit 22a generates the ProbeMatch message in response to the Probe message received via the communication processing unit 21 and the communication device 17. The keyword for use as the search key is provided by the apparatus search unit 27. Further, the message transmission unit 22a may describe the keyword search condition including two or more search keys in the Probe message.

The message analysis unit 22b performs the syntactic analysis of the SOAP message received via the communication processing unit 21 and the communication device 17, and specifies a request, a response, a notification, and the like that are described in the message.

By the SOAP messages transmitted between the SOAP processing unit 22 of the image forming apparatus 1 and the SOAP processing unit 22 of the other image forming apparatuses 2 and/or 3, the other image forming apparatuses 2 and/or 3 are searched by the web service using WS-Discovery and searched by the keyword using WS-Discovery.

When the image forming apparatus 1 searches for the other image forming apparatuses 2 and/or 3 by the keyword, the message transmission unit 22a of the image forming apparatus 1 generates the Probe message including the keyword as the search key, and transmits the Probe message via the communication processing unit 21 and the communication device 17 of the image forming apparatus 1. The image forming apparatus 1 transmits the Probe message to the other image forming apparatuses 2 and/or 3 via multicast. For example, when the keyword in the Probe message matches the keyword in the keyword list 15a stored in the storage device 15 of the image forming apparatus 2, the image forming apparatus 2 transmits a message to the image forming apparatus 1, and the message analysis unit 22b of the image forming apparatus 1 identifies the received message as the ProbeMatch message.

On the other hand, when the other image forming apparatuses 2 and/or 3 search for the image forming apparatus by keyword, the communication processing unit 21 of the image forming apparatus 1 receives a Probe message from the other image forming apparatuses 2 and/or 3, and the message analysis unit 22b of the image forming apparatus 1 retrieves the keyword as the search key from the received Probe message. In the second embodiment, the Probe message is the keyword search request for the image forming apparatus 1. If the keyword as the search key matches the keyword in the keyword list 15a stored in the storage device 15 of the image forming apparatus 1, the message transmission unit 22a of the image forming apparatus 1 generates a ProbeMatch message. The image forming apparatus 1 transmits the ProbeMatch message to the other image forming apparatuses 2 and/or 3 via unicast. If the keyword does not match the keyword list 15a in the storage device 15 of the image forming apparatus 1, the ProbeMatch message is not generated and/or transmitted.

The apparatus search unit 27 is a processing unit that uses the SOAP processing unit 22 to search for the other image forming apparatuses 2 and/or 3 having the function of transmitting the setting data with a predetermined search key (in the second embodiment, "SettingDataCopying").

The keyword determination unit 24 is a processing unit that determines whether or not the keyword as the search key retrieved from the Probe message received by the communication processing unit 21 matches the keyword in the keyword list 15a stored in the storage device 15.

It should be noted that, when a keyword search condition is described in the Probe message, the keyword determination unit 24 searches for the keyword stored in the storage device 15 on the basis of the keyword search condition.

For example, as the keyword search condition, the Probe message includes a search expression including one or more keywords. The keyword determination unit 24 determines whether or not the one or more keywords match the keyword stored in the storage device 15 on the basis of the search expression. The search expression may represent a logical operation expression of one or more keywords. For example, the search expression "SettingDataCopying AND Designing Department" is a logical product of two keywords "SettingDataCopying" and "Designing Department", and it is determined whether or not the keyword "SettingDataCopying" matches the keyword stored in the storage device 15 and whether or not the keyword "Designing Department" simultaneously matches the keyword stored in the storage device 15.

Further, the keyword search condition may include a match condition for the keyword. The match condition for the keyword represents at least one of "perfect match search", "partial match search", "prefix search", and "suffix search". A successful perfect match search means that both the search key and the keyword stored in the storage device 15 are the same. A successful partial match search means that the search key is the same as a part or all of the keyword stored in the storage device 15. A successful prefix search means that the search key is the same as a leading part or all of the keyword stored in the storage device 15. A successful suffix search means that the search key is the same as a trailing part or all of the keyword stored in the storage device 15.

The setting data request unit 25 is a processing unit that uses the communication device 17 and the communication processing unit 21 to transmit a setting data request to the other image forming apparatuses 2 and/or 3 specified by the apparatus search unit 27, and to receive the setting data.

The setting data transmission unit 26 is a processing unit that uses the communication device 17 and the communication processing unit 21 to receive a setting data request from the other image forming apparatuses 2 and/or 3, and to read the setting data 15b from the storage device 15 when receiving the setting data request and transmit the setting data 15b to the other image forming apparatuses 2 and/or 3 in response to the setting data request.

The control unit 23 is a processing unit that controls internal devices realizing various functions, such as an operation panel 11, a printing device 12, an image reading device 13, a facsimile device 14, or a communication device 17, to execute a job on the basis of a user operation initiated via the operation panel 11.

Further, if initial setting of the setting data 15b has not been performed when the communication device 17 is connected to the network 4, the control unit 23 causes the setting data request unit 25 to receive the setting data 15b transmitted from the other image forming apparatuses 2 and/or 3, generate the setting data 15b based on one or more setting data 15b received by the setting data request unit 25, and store the setting data 15b in the storage device 15 of the image forming apparatus 1.

Figure 8:
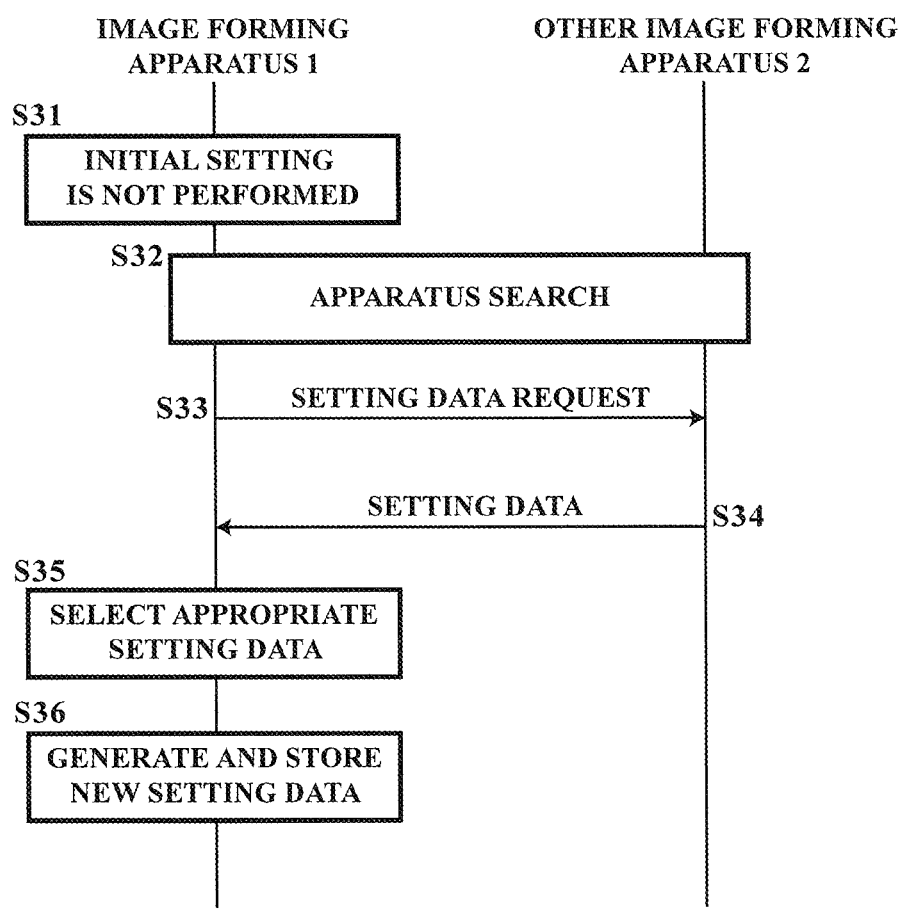
FIG. 8 is a sequence diagram illustrating operations for initial setting of setting data according to the second embodiment.

FIG. 8 is a sequence diagram illustrating the operations of the image forming apparatus 1 and 2 for the initial setting of the setting data 15b.

At the image forming apparatus 1, when the communication device 17 is connected to the network 4, the control unit 23 determines whether or not the initial setting of the setting data 15b has already been performed (Step S31), and if the initial setting of the setting data 15b has not been performed yet, executes the following initial setting process.

The control unit 23 causes the apparatus search unit 27 to search for the other image forming apparatuses 2 and/or 3 having the function of transmitting the setting data. Among the other image forming apparatuses 2 and/or 3 connected to the network 4, the apparatus search unit 27 of the image forming apparatus 1 specifies the other image forming apparatus 2 having the function of transmitting the setting data (Step S32).

When the apparatus search unit 27 specifies the other image forming apparatus 2, the setting data request unit 25 uses the communication processing unit 21 and the communication device 17 to transmit the setting data request to the other image forming apparatus 2 (Step S33).

At the other image forming apparatus 2, the setting data transmission unit 26 receives the setting data request via the communication processing unit 21 and the communication device 17. When receiving the setting data request, the setting data transmission unit 26 reads the setting data 15b from the storage device 15, and transmits the setting data 15b as a response to the setting data request (Step S34).

At the image forming apparatus 1, the setting data request unit 25 receives the setting data 15b, and the control unit 23 generates new setting data based on the received setting data 15b. Then, the control unit 23 stores the new setting data in the storage device 15 as the setting data 15b on the image forming apparatus 1 (Step S36).

It should be noted that, among the setting items of the received setting data 15b, setting items that do not exist in the setting data 15b in the image forming apparatus 1 may be discarded. Further, among the setting items of the setting data 15b on the image forming apparatus 1, the setting items that do not exist in the received setting data 15b are maintained without changing the corresponding setting values.

Further, if two or more other image forming apparatuses are specified, the control unit 23 selects the appropriate setting data 15b for the image forming apparatus 1 from the received two or more setting data 15b (Step S35). For example, the control unit 23 compares the setting items of the setting data 15b in the storage device 15 of the image forming apparatus 1 with the setting items of the received setting data 15b, and selects the setting data 15b having the largest number of the same setting items. Then, the control unit 23 generates the new setting data by combining the selected setting data 15b, and stores the new setting data in the storage device 15 as the setting data 15b in the image forming apparatus 1 (Step S36). Thus, the setting data 15b stored when the image forming apparatus 1 is shipped from the factory is updated during the initial setting process.

Figure 9:
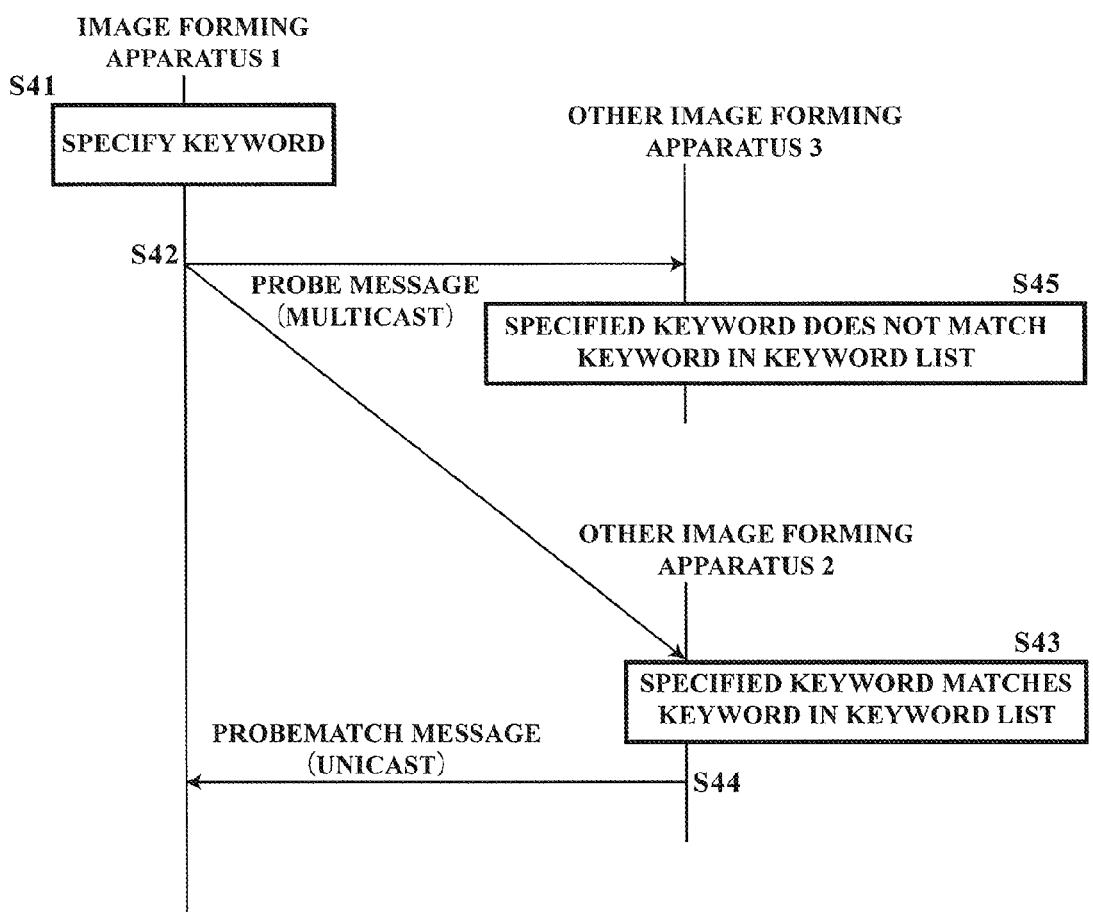
FIG. 9 is a sequence diagram illustrating an image forming apparatus search method according to the second embodiment.

Next described is the apparatus search set forth in Step S32 in FIG. 8. The apparatus search is performed by the keyword using WS-Discovery. FIG. 9 is a sequence diagram illustrating the apparatus search.

At the image forming apparatus 1, the apparatus search unit 27 retrieves a keyword as the search key (and/or the keyword search condition) used to search for the other image forming apparatuses 2 and/or 3 having a function of transmitting the setting data, and notifies the SOAP processing unit 22 of the keyword (Step S41). It should be noted that, the keyword search condition may be stored in the storage device 15 with the keyword as the search key and read by the apparatus search unit 27.

The message transmission unit 22a of the SOAP processing unit 22 generates the Probe message including the keyword as the search key. The communication processing unit 21 uses the communication device 17 to transmit the Probe message via multicast (Step S42). FIG. 10 is a diagram illustrating an example of the Probe message according to the second embodiment. The Probe message includes a Probe element. In the Probe message, a keyword element is described as a child element of the Probe element, and the keyword ("SettingDataCopying") is described as a value of the keyword element.

The Probe message is transmitted via the network 4, and received by the other image forming apparatuses 2 and/or 3.

At the other image forming apparatuses 2 and/or 3, the communication processing unit 21 receives the Probe message via the communication device 17, and the message analysis unit 22b analyzes the Probe message and retrieves the keyword in the Probe message.

Then, the keyword determination unit 24 of the other image forming apparatus(es) 2 and/or 3 searches the keyword list 15a using the retrieved keyword, and determines whether or not the retrieved keyword matches the keyword in the keyword list 15a.

In FIG. 9, if the retrieved keyword from the Probe message matches the keyword in the keyword list 15a by the keyword determination unit 24 of the other image forming apparatus 2 (Step S43), the message transmission unit 22a of the other image forming apparatus 2 generates a ProbeMatch message, and then the other image forming apparatus 2 transmits the ProbeMatch message to the image forming apparatus 1 (Step S44).

FIG. 11 is a diagram illustrating an example of the ProbeMatch message according to the second embodiment. The ProbeMatch message corresponds to the Probe message illustrated in FIG. 10.

The ProbeMatch message includes a ProbeMatch element. In the ProbeMatch message illustrated in FIG. 11, an endpointReference element and the keyword element are described as child elements of the ProbeMatch element. The keyword ("SettingDataCopying") specified in the search key is described as the value of the keyword element. An identifier such as a URI or UUID of the image forming apparatus 1 on the network 4 is described as the value of the endpointReference element.

On the other hand, in FIG. 9, if the retrieved keyword from the Probe message does not match the keyword in the keyword list 15a by the keyword determination unit 24 of the image forming apparatus 3 (Step S45), a process is finished without generating and/or transmitting the ProbeMatch message.

As above-description, the other image forming apparatus 2 having the function of transmitting the setting data is searched for.

According to the above-described second embodiment, by the keyword search using WS-Discovery, it is possible to automatically search for the image forming apparatus 2 as a copy source of an initial setting value within a short time period.

The present disclosure of the second embodiment includes various other embodiments. For example, other designs can be used in which the above-described components are each performed.

In the second embodiment, among the setting data 15b of two or more other image forming apparatuses specified by the apparatus search unit 27, one setting data selected by the user may be stored as the setting data 15b on the image forming apparatus 1.

In the above-described case, the control unit 23 displays the list of the two or more other image forming apparatuses specified by the apparatus search unit 27 on the display device of the operation panel 11.

When the user operation for selecting one other image forming apparatus from the list is detected by the operation panel 11, the control unit 23 of the image forming apparatus 1 uses the setting data request unit 25 to request the setting data 15b from the selected other image forming apparatus 2. The setting data request unit 25 of the image forming apparatus 1 transmits the setting data request to the selected other image forming apparatus 2, and receives the setting data 15b. When receiving the setting data request, the image forming apparatus 2 that has received the setting data request transmits the setting data 15b to the image forming apparatus 1. Then, the control unit 23 of the image forming apparatus 1 generates new setting data based on the setting data 15b received via the setting data request unit 25, and stores the new setting data in the storage device 15 as the setting data 15b.

In the second embodiment, while the user may use the operation panel 11 as a user interface, the user may also use a client apparatus or the like connected to the network 4 as a remote user interface.

In the second embodiment, if the setting data 15b of the two or more other image forming apparatuses are received via the setting data request unit 25, the control unit 23 of the image forming apparatus 1 may select, for each category, the setting data 15b having the largest number of the same setting items, generate the new setting data by combining the setting data 15b selected for each category, and store the new setting data in the storage device 15. The categories may include a print setting, a network setting, and a finisher setting, and the like.

For example, if two setting data 15b are received in which a first setting data 15b includes a larger number of the same setting items for the print setting and a second setting data 15b includes a larger number of the same setting items for the network setting, the control unit 23 may select the first setting data 15b for the print setting, and select the second setting data 15b for the network setting, and generate the new setting data.

Further, for example, if two setting data 15b are received in which a third setting data 15b does not include a setting item for the finisher setting and a fourth setting data 15b includes the setting item for the finisher setting, the control unit 23 may select the fourth setting data 15b for the finisher setting, irrespective of selecting which of the third setting data 15b and the fourth setting data 15b for any category other than the finisher setting, and generate the new setting data.

In the second embodiment, for the each category, the operation panel 11 may detect the user operation for selecting one image forming apparatus from the list of the specified two or more other image forming apparatuses. Then, at the image forming apparatus 1, the setting data request unit 25 may request and receive the setting data from the other image forming apparatus selected for the each category, and the control unit 23 may generate the new setting data on the image forming apparatus 1 by combining the received setting data 15b and store the new setting data in the storage device 15.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming system, comprising:
an image forming apparatus connected to a network; and
a client apparatus connected to the network,
wherein the client apparatus comprises:
   a first communication processing unit configured to transmit a Probe message including a search keyword to the image forming apparatus and to receive a ProbeMatch message from the image forming apparatus; and
wherein the image forming apparatus comprises:
   a storage device configured to store a settings keyword;
   a second communication processing unit configured to receive the Probe message from the first communication processing unit;

a message analysis unit configured to retrieve the search keyword from the Probe message; and a keyword determination unit configured to determine whether or not the keyword in the Probe message matches the keyword stored in the storage device;

wherein the second communication processing unit is further configured to, if the search keyword from the Probe message matches the settings keyword stored in the storage device, transmit the ProbeMatch message to the first communication processing unit;

wherein the Probe message includes an identifier that distinguishes the Probe message from a web service search performed using WS-Discovery;

wherein the keyword determination unit is configured to determine whether or not the search keyword in the Probe message matches the settings keyword stored in the storage device if the Probe message includes the identifier; and wherein the second communication processing unit is configured to transmit the ProbeMatch message to the first communication processing unit when the image forming apparatus provides the web service specified in the Probe message.

2. The image forming system according to claim 1, wherein the Probe message and the ProbeMatch message each comprise a Simple Object Access Protocol (SOAP) message, and wherein the first communication processing unit and the second communication processing unit use a User Datagram Protocol/Internet Protocol (UDP/IP) for transmitting/receiving the SOAP message.

3. The image forming system according to claim 1, wherein the search keyword retrieved from the Probe message comprises a keyword search condition, and wherein the keyword determination unit is configured to determine whether or not the keyword search condition matches the settings keyword stored in the storage device.

4. The image forming system according to claim 3, wherein the keyword search condition includes a search expression including a keyword.

5. The image forming system according to claim 3, wherein the keyword search condition includes at least one of "perfect match search", "partial match search", "prefix search", and "suffix search".

6. An image forming apparatus search method using WS-Discovery, comprising:

via a client apparatus connected to a network, transmitting a Probe message including a search keyword to an image forming apparatus connected to the network;

via the image forming apparatus:
receiving the Probe message from the client apparatus, retrieving the search keyword from the Probe message, determining whether or not the search keyword retrieved from the Probe message matches a settings keyword stored in the image forming apparatus, and transmitting a ProbeMatch message to the client apparatus if the search keyword retrieved from the Probe message matches the settings keyword stored in the image forming apparatus, wherein the Probe message includes an identifier that distinguishes the Probe message from a web service search performed using WS-Discovery.

7. The image forming apparatus search method according to claim 6, wherein the Probe message and the ProbeMatch message each comprise a Simple Object Access Protocol (SOAP) message.

8. The image forming apparatus search method according to claim 6, wherein the search keyword retrieved from the Probe message comprises a keyword search condition, and wherein the determining whether or not the search keyword retrieved from the Probe message matches a settings keyword stored in the image forming apparatus comprises determining whether the keyword search condition matches the settings keyword stored in the storage device.

9. An image forming system, comprising:
an image forming apparatus connected to a network; and
another image forming apparatus connected to the network,
wherein the image forming apparatus comprises:
a first communication processing unit configured to transmit a Probe message including a search keyword requesting whether the another image forming apparatus has a function of transmitting setting data to the another image forming apparatus and receive a ProbeMatch message from the another image forming apparatus;

an apparatus search unit configured to specify the another image forming apparatus that has transmitted the ProbeMatch message as the another image forming apparatus having the function of transmitting the setting data;

a setting data request unit configured to transmit a request for the setting data to the another image forming apparatus that has transmitted the ProbeMatch message to the first communication processing unit; and a control unit configured to generate new setting data based on the setting data received via the setting data request unit, and to store the new setting data in the storage device;

wherein the another image forming apparatus comprises:
a storage device configured to store a settings keyword;
a second communication processing unit configured to receive the Probe message from the first communication processing unit;
a message analysis unit configured to retrieve the keyword from the Probe message; and
a keyword determination unit configured to determine whether or not the search keyword requesting whether the another image forming apparatus has the function of transmitting the setting data retrieved from the Probe message matches the settings keyword stored in the storage device;
wherein the second communication processing unit is further configured to, if the search keyword from the Probe message matches the settings keyword stored in the storage device, transmit the ProbeMatch message to the first communication processing unit.

10. The image forming system according to claim 9, wherein the settings keyword is configured to vary based on the type of the another image forming apparatus.

11. The image forming system according to claim 9, wherein, if two or more setting data are received via the setting data request unit, the control unit is configured to select the setting data having a largest number of the same setting items and to generate the new setting data by combining the selected setting data.

12. The image forming system according to claim 11, wherein the control unit is configured to select the setting data having the largest number of the same setting items for each of a plurality of categories.

13. The image forming system according to claim 11, wherein, if one setting data of the two or more setting data does not include a setting item for a specific category and the other setting data of the two or more setting data includes the setting item for the specific category, the control unit is configured to select the other setting data for the specific category, irrespective of selecting which of the one setting data and the other setting data for any category other than the specific category.

14. The image forming system according to claim 9, wherein the image forming apparatus further comprises:
   a display device configured to display a list of the another image forming apparatus specified by the apparatus search unit; and
      an input device configured to detect a user operation for selecting the another image forming apparatus from the list; and
   wherein the setting data request unit is configured to transmit the request for the setting data to the another image forming apparatus selected by the user operation via the input device.

15. The image forming system according to claim 14, wherein the input device is configured to detect the user operation for selecting the another image forming apparatus from the list for each category.

* * * * *